United States Patent [19]
Dulin et al.

[11] 3,880,629
[45] Apr. 29, 1975

[54] AIR POLLUTION CONTROL PROCESS FOR GLASS MANUFACTURE

[75] Inventors: Jacques M. Dulin, Libertyville, Ill.; Edward C. Rosar, Lakewood, Colo.

[73] Assignee: Industrial Resources, Inc., Chicago, Ill.

[22] Filed: July 9, 1973

[21] Appl. No.: 377,388

[52] U.S. Cl. .................. 65/27; 65/168; 423/244
[51] Int. Cl. ............................................. C03b 1/00
[58] Field of Search ...... 65/27, 168; 55/DIG. 60.41, 55/211, 214; 423/242, 244

[56] References Cited
UNITED STATES PATENTS

| | | | |
|---|---|---|---|
| 2,198,745 | 4/1940 | Smith | 65/27 |
| 3,395,512 | 8/1968 | Finney, Jr. et al. | 55/341 |
| 3,789,628 | 2/1974 | Mahoney | 65/27 |

OTHER PUBLICATIONS
Chemical Week, Technology Newsletter, May 31, 1969, page 71.
Chemical and Engineering News, June 2, 1969, page 39.

*Primary Examiner*—Arthur D. Kellogg
*Attorney, Agent, or Firm*—Jacques M. Dulin, Esq.

[57] ABSTRACT

A process for manufacture of glass using a wet or dry sodium alkali source, preferably of the carbonate type such as crude Nahcolite Ore, either raw or calcined, sodium carbonate or the like for $SO_x$ and furnace particulates emissions control and for $Na_2O$ values. The $SO_x$ and particulates are collected in a baghouse in which dry powdered Nahcolite Ore is used in the dual function of a particulates filter aid and as an absorbent which reacts with the $SO_x$ to form $Na_wH_yS_zO_x$, principally $Na_2SO_3/SO_4$ or the corresponding hydrosulfite, sulfide, hyro-, tetra- and pentasulfides, bisulfite, bisulfate, peroxydisulfate, pyrosulfate, or pyrosulfite. In a second embodiment an aqueous sodium alkali, such as an $NaHCO_3$ or $Na_2CO_3$ solution, preferably raw or calcined crude Nahcolite Ore dissolved in water, is sprayed at a controlled rate into the hot (200°–1500°F) flue gases coming off the glass furnaces. The $SO_x$ reacts with the sodium alkali solution and the heat of the flue gas dries out the resultant sodium sulfur oxide salts which, along with particulates are collected in the baghouse. The baghouse filter cake is recycled to the glass furnace so that the process is in material balance without producing potentially water pollutable wastes.

32 Claims, 2 Drawing Figures

Fig. 2

AIR POLLUTION CONTROL PROCESS FOR GLASS MANUFACTURE

FIELD OF THE INVENTION

This invention relates to a pollution control process for commercial glass manufacture, typically for containers, flat or plate glass, or technical special glasses. More particularly, this invention relates to $SO_x$ and particulates emissions control from glass manufacture with recycle of the resultant wastes to the glass process, thereby avoiding water pollution by conventional disposal techniques. Process embodiments permit the sodium alkali being used for the $Na_2O$ requirements of the glass to be used for the pollution control aspects of the process, or conversely the $SO_x$ pollutant sorbent is also useful for the $Na_2O$ requirements. The emissions control portion of the process is characterized as being simple in operation and equipment, highly efficient, and having low energy requirements, such as low pressure drop, and no reheat.

BACKGROUND

Glass manufacture results in two principal pollutants from the glass furnaces: (1) fine particulates of glass batching components blown through the furnace by the furnace draft or flame pressure, and (2) $SO_2$ and $SO_3$ ($SO_x$) evolution from the $Na_2SO_4$ fining agent used in the glass batch.

The particulates fines are difficult to collect in electrostatic precipitators for two major reasons. First, the fines blown through the furnace tend to be the smaller sub-micron sized particulates since larger, heavier particles cannot easily be carried by the flue gases and fall out in the furnace. These fines are in the size range of least collection efficiency of electrostatic precipitators. Second, the resistivity of the fines is high, rendering collection by electrostatic methods inherently inefficient. The very fine particulates that pass through such collectors are proving to be significant in their adverse health effects.

Other particulates collection devices, such as cyclone collectors tend to be even less efficient, especially for such small fines, and have a very high energy requirement, particularly in the large pressure drop.

Wet scrubbers using lime, limestone, sodium hydroxide or sodium carbonate, have been proposed and are under development for $SO_x$ control in power plants, where, typically, the amounts of $SO_x$ in the flue gases are far greater than in glass manufacture. While sodium alkalis are better for internal scrubber operation since they do not contribute to caking or scale formation, the end product sodium sulfur oxide salt, e.g., sodium sulfate or sulfite is a water pollutant. The result is to go from the frying pan into the fire, trading a water pollution problem for an air pollution problem when employing a sodium alkali.

To overcome the sodium scrubber wastes water pollution problem, lime or limestone has been used in scrubbers. However, the insoluble calcium carbonate or calcium oxide causes high abrasion of scrubber, piping, nozzle and pump parts, and is a source of scale or sludge that plugs the scrubber or the downstream demisters. Further, reduced reactivity, as compared to sodium alkalis, and the need to keep the amount of undissolved calcium alkali particles low, results in high liquid to gas ratios, on the order of 50–100 gallons/MCF.

A hybrid approach is the so-called double alkali process. A soluble sodium alkali is used in the scrubber, and the water pollution problem is solved by reacting the sodium sulfate or sulfite (or bisulfite or bisulfate) with lime or limestone external to the scrubbers. The process chemistry has proven difficult to put into operation on a continuous basis, requires two reactants, complex plumbing and process control sensors, controllers and other devices, and has an increased capital investment as compared to once-through throw-away processes.

Wet scrubbers also are energy hungry, having a high pressure drop, high pumping requirements since liquid rather than air must be circulated, are sensitive to chlorides in the water, and require reheat of the cleaned flue gases in order to get efficient stack ejection or avoid a plume.

Alkali sprays have been tried or proposed for use in coal or oil-fired power plant flue gas $SO_x$ control, alone or in conjunction with wet scrubbers as a mode of flue gas-alkali solution contact. Typical use in scrubbers is for demister vane washing to prevent or reduce scaling or plugging. Sprays alone followed by two-stage collection, a mechanical cyclone as stage 1 and an electrostatic precipitator as stage 2, have been proposed and pilot tested. This latter assembly is expensive, requiring two collection devices in series, and has a high overall pressure drop, principally through the cyclone. Further, it does not appear to have been tried for glass making, possibly because of inefficiency of electrostatic precipitators to collect high resistivity, very fine glass batching ingredients.

Still other alkali recycle processes such as the Wellman-Lord sodium sulfite-bisulfite process, the MgO process, the molten carbonate process and the like are under development. These also have difficulties of process operation. In addition, the capital investment required for recycle is usually more than double than for throw-away once-through processes.

Finally, baghouses are useful for particulates control but are not generally operable for sustained periods much above the 450°–550°F range without very special bag materials. In contrast, glass furnace flue gas is generally in the range of 500°–1500°F. The bags can be "burned up" when an upset condition of overheated flue gas contacts the bags, and may be prone to bag blinding when the temperature is dropped below the dewpoint. Further, calcium alkali sorbents, useful for $SO_x$ emissions control in a wet scrubber, are essentially unreactive in a dry state at the low temperatures of baghouse operation. Synthetic, commercial sodium bicarbonate is a more reactive dry sorbent than sodium carbonate, lime, or limestone, but is expensive and most efficient at the upper limits of permissable baghouse temperature operation, 450°–550°F. Also, sodium carbonate or bicarbonate results in a serious disposal problem in that resultant sodium sulfite/sulfate, being water soluble, are water pollutants. Sodium hydroxide apparently is not used in a baghouse because of expense, handling difficulties, e.g., water vapor absorption, and causticity.

There is thus an unsolved need to control both particulates and $SO_x$ emissions present in glass manufacture flue gases by a process that is efficient, simple, inexpensive, does not result in a water pollutant, does not require extensive modifications to glass processing operations, can be easily retrofit onto existing glass plant equipment and available space, and which pollution control process can permit glass manufacturers to meet particulates and $SO_x$ emissions codes.

OBJECTS

It is among the objects of this invention to provide an $SO_x$ and particulates emission control process for glass manufacture.

It is another object to provide such a process which has low pressure drop, is highly efficient, and wherein $SO_x$ wastes can be recycled to the glass batch without causing a water pollution problem.

It is another object to provide such a process that uses a sodium alkali as a sorbent.

It is another object to provide a plurality of embodiments of such a process which can advantageously use the sodium alkali either in a wet or dry contact mode.

It is another object to provide such a process wherein conventional soda ash used in the glass making process can be used as the $SO_x$ sorbent even though it is not highly efficient dry and when used wet in ordinary processes would result in volumes of a sodium sulfite/sulfate solution that presents a water pollution problem in its disposal.

It is another object to provide an improved process for removal of $SO_x$ and particulates from flue gases using a sodium alkali sorbent in a special wet spray-dry collection system.

It is another object to provide a special sodium alkali sorbent, Nahcolite Ore, raw, crude calcined, or refined, for both the pollution control phase of the process and for the $Na_2O$ content of the glass in a reactant integrated process that permits emissions control wastes to be recycled without a water pollution hazard.

It is another object to provide a sodium alkali process for emissions controls from glass furnaces that is simple, relatively cheap, closed loop, efficient and has a reasonably low degree of difficulty of retrofit to existing plants without substantial change in basic glass making technology.

Still other objects will be evident from the summary and detailed description which follows.

FIGURES

The detailed description below has reference to the drawings, in which:

FIG. 1 is a schematic flow sheet showing a first embodiment of the invention process in which the sodium alkali is used as a dry sorbent in a baghouse, and FIG. 2 is a second embodiment of the invention process in which a sodium alkali is used in the form of an aqueous solution.

SUMMARY

A sodium alkali is used as an $SO_x$ sorbent, wet or dry, injected into the hot flue gas issuing from a glass furnace and thereafter collected in a baghouse as a dry filter cake. The dry baghouse filter cake contains a resultant sodium sulfur oxide salt, generically inclusive of sodium sulfate, sulfite, hydrosulfite, bisulfate, bisulfite, sulfide, hydrosulfide, tetra- and pentasulfides, pyrosulfite, pyrosulfate, peroxydisulfate, and mixtures thereof (hereinafter abbreviated as $Na_wH_yS_zO_x$ where $w = 1$ or 2; $y = 0$ or 1; $z = 1, 2, 4$ or 5; and $x = 0, 3, 4, 5, 7$ or 8, and omitting waters of hydration in pertinent cases) and glass batching fines which, after appropriate sizing is recycled to the glass melt to provide glass ingredients and $Na_wH_yS_zO_x$ as a fining agent. Depending on the nature of the sodium sorbent, the mode of baghouse operation, and the flue gas temperature, the $SO_x$ removal efficiencies range on the order of 60–99 percent and particulates collection in the range of about 85–99.5 percent, or higher.

The preferred sodium alkali is the same material as is used as the primary $Na_2O$ source for the glass so that a single compatible reactant is used. Where soda ash is relied on as the $Na_2O$ source, the inherent relative unreactivity of the $Na_2CO_3$ in a dry state is overcome by spraying a solution of the $Na_2CO_3$ at a controlled rate and low l/g ratio, e.g., below about 20 gal/MCF, into the hot flue gas upstream of the baghouse. The $SO_x$ reacts with the $Na_2CO_3$ in solution forming a $Na_wH_yS_zO_x$ solution which subsequently or simultaneously dries to a fine waste powder while cooling the flue gas somewhat. This $Na_wH_yS_zO_x$ waste powder is collected with high efficiency and low pressure drop in the baghouse along with glass batch fines as part of the baghouse filter cake. Sodium hydroxide solution may also be used as the sodium alkali in this embodiment. The $SO_x$-particulates emissions control portion of the process may be adapted to use with any flue gas, for example industrial and power plants burning coal or oil fuels.

The preferred sodium alkali is Nahcolite Ore, a naturally occurring mineral containing sodium bicarbonate in the range of from about 50–95 percent, depending on assay, and from 5–50 percent of other natural co-occurring minerals, principally dolomites, dawsonite, silicas, feldspar, calcites and kerogen. The Nahcolite Ore may be used raw, as a crude calcined ore, or as upgraded ore or commercially processed material. It may be used in aqueous solution as with the $Na_2CO_3$. The dry Nahcolite Ore is more reactive than soda ash and can be injected as a powder into the baghouse where it collects on the bags. There it acts as a particulates filter aid for collection of the glass batch fines, and reacts as a dry sorbent with the $SO_x$ to form the $Na_wH_yS_zO_x$. The resultant baghouse cake is recycled as before to the glass batch. The Nahcolite Ore is also useful as a substitute for part or all of the soda ash as the glass $Na_2O$ source, depending on glass type to be produced and Nahcolite Ore type and assay.

The baghouse collection method provides for low pressure drop, high collection efficiency, simplicity of operation, simultaneous $SO_x$ and particulates emissions control, does not have high energy requirements, there is no flue gas reheat required, and no plume is produced.

DETAILED DESCRIPTION

Figure 1:
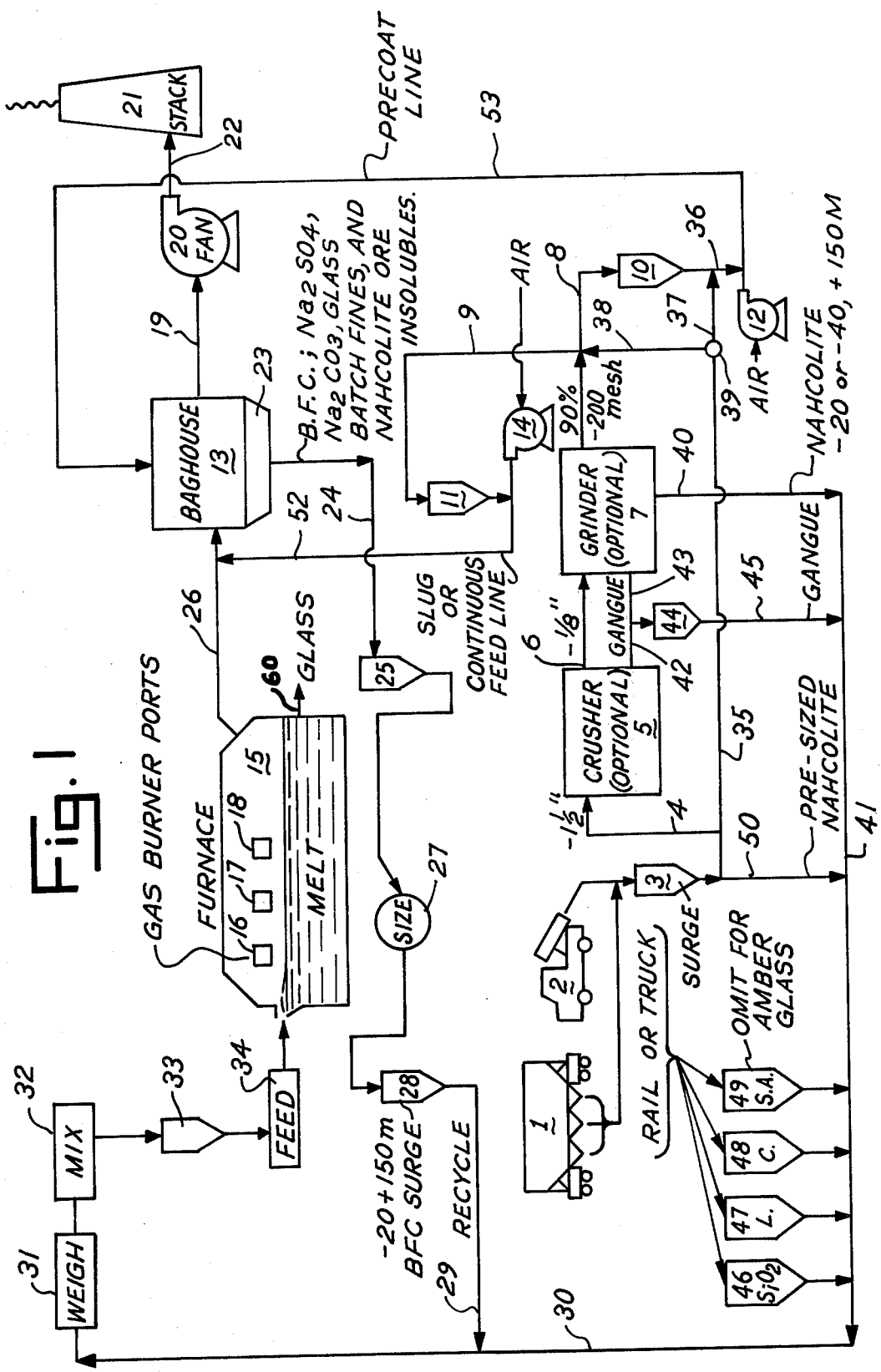

The detailed description which follows is by way of example and not by way of limitation of the principles of this invention.

The sodium sorbents contemplated herein include sodium hydroxide (spray only), soda ash of various grades, sodium carbonate, several hydrous and anhydrous types of sodium sesquicarbonate, Trona ($Na_2CO_3.NaHCO_3.2H_2O$), sodium bicarbonate, Nahcolite ($NaHCO_3$), Wegscheiderite ($Na_2CO_3.3NaHCO_3$), Thermonatrite ($Na_2CO_3.H_2O$), Natron ($Na_2CO_3.10H_2O$), Dawsonite ($NaAlCO_3(OH)_2$), Eitelite ($Na_2CO_3.MgCO_3$), Shortite ($Na_2CO_3.2CaCO_3$), Pirssonite ($Na_2CO_3.CaCO_3.2H_2O$), Gaylussite ($Na_2CO_3.CaCO_3.5H_2O$), Burbankite ($Na_2Ca_4(CO_3)_5$), Northupite ($Na_2Mg(CO_3)_2.NaCl$), Bradleyite ($Na_3MgCO_3PO_4$), Tychite ($Na_6Mg_2(CO_3)_4(SO_4)$), crude Trona-type brines from Searles Lake or Owens Lake, California, alkalized alumina, sodium sulfite, sodium bisulfite, and other authigenic sodium-containing minerals. Mixtures of the additives are included.

The preferred sodium alkali sorbent is Nahcolite Ore since it can be used wet or dry, or raw without processing other than crushing, grinding, and, in the case of the wet process embodiment, dissolving it in water. Calcined, ground Nahcolite Ore, or ore further processed by solution recrystallization can be used as well. The insoluble gangue material of the Nahcolite Ore has been found to be useful in some glass types, particularly in green glass, and in some amber glasses.

A typical raw Nahcolite Ore assay range would be:

TABLE I

| Components | Range wt. % | | |
|---|---|---|---|
| A. Cold Water Solubles | | | |
| 1) $NaHCO_3$ | 75.0 | – | 85.3 |
| 2) $Cl^-$ | 0.0033 | – | 0.0560 |
| B. Cold Water Insolubles | | | |
| 1) Dolomite - $CaMg(CO_3)_2$ | 7.45 | – | 4.73 |
| 2) Dawsonite $NaAlCO_3(OH)_2$ | 2.65 | – | 1.65 |
| 3) Silica - $SiO_2$ | 2.56 | – | 0.59 |
| 4) Iron - Fe | 0.45 | – | 0.38 |
| 5) Sulfur (Organic + $FeS_2$) | 0.52 | – | 0.45 |
| 6) K - Feldspar and Calcite ($K_rAl_9Si_3O_{tr}$ and $CaCO_3$) | 8.98 | – | 5.87 |
| 7) Total Organics | 2.37 | – | 1.03 |
| (Organic Carbon Alone) | (1.91) | – | (0.83) |
| Subtotal | 25.0 | – | 14.7 |

Such Nahcolite ores typically would have elemental, compositional and acid insoluble residue analyses (in weight percent) as follows:

TABLE II

Nahcolite Ore Analysis
Elemental

| | |
|---|---|
| pH (1 gram in 100 ml $H_2O$) | 8.40 |
| Sodium (Na), % | 19.23 |
| Calcium (Ca), % | 2.67 |
| Magnesium (Mg), % | 0.80 |
| Carbonate ($CO_3$), % | 57.70 |
| Sulfate ($SO_4$), % | 0.02 |
| Nitrate ($NO_3$), % | 0.01 |
| Nitrite ($NO_2$), % | 0.0001 |
| Sulfite ($SO_3$), % | None |
| Acid insoluble, % | 17.9 |
| Acid insoluble at 550°C, % | — |

TABLE III

Nahcolite Ore Analysis
Compositional Analysis

| | |
|---|---|
| Sodium bicarbonate ($NaHCO_3$), % | 70.0 |
| Sodium carbonate ($Na_2CO_3$), % | 0.0 |
| Magnesium carbonate ($MgCO_3$), % | 2.8 |
| Calcium carbonate ($CaCO_3$), % | 6.7 |
| Non-reactive material, % (acid insoluble + moisture) | 20.5 |

TABLE IV

Nahcolite Ore Spectrographic Analysis
of Acid Insoluble Residue Ignited at 550°C, %

| | |
|---|---|
| Sodium | 14. |
| Potassium | 6.0 |

TABLE IV-Continued

Nahcolite Ore Spectrographic Analysis
of Acid Insoluble Residue Ignited at 550°C, %

| | |
|---|---|
| Silicon | 17. |
| Aluminum | 6.7 |
| Iron | 0.97 |
| Magnesium | 0.20 |
| Boron | trace |
| Titanium | 0.39 |
| Calcium | 0.11 |
| Manganese | 0.015 |
| Gallium | 0.0045 |
| Molybdenum | 0.0056 |
| Vanadium | 0.0043 |
| Copper | 0.022 |
| Nickel | 0.0068 |
| Silver | 0.0028 |
| Zirconium | 0.0065 |
| Cobalt | 0.0022 |
| Strontium | 0.0058 |
| Chromium | 0.0059 |

EXAMPLE 1

Referring to FIG. 1, in a first embodiment of the process of this invention, Nahcolite Ore, (raw, crude calcined, or processed), is used as an air pollution control material and as a substitute for soda ash in glass manufacture.

Nahcolite Ore is shipped in by rail 1 or truck 2 and the ore as received is placed in surge bin 3. Turning first to the use of the Nahcolite Ore as the air pollution control material, the ore as received, typically −1½ inch size, is passed via material handling means (conveyor) 4 to crusher 5 which crushes the ore, typically to −⅛ inch size. The crushed ore is passed via material handling means 6 to a grinder 7 which reduces the ore to the desired size range, typically 90 percent passing 200 mesh. Other typical mesh sizes could be a mixture of sizes, or a single size on the order of 325 mesh. The crushed material is split into two streams 8 and 9 and passed to surge bins 10 and 11, respectively. Typically 20 percent of the crushed Nahcolite feed is stored in surge bin 10 and 80 percent would be stored in surge bin 11.

Ground ore from surge bin 10 is used to precoat the bags in the baghouse 13 via fan 12 with approximately 20 percent of the total Nahcolite Ore feed. This precoat is a thin layer of ground Nahcolite Ore coated on the bags so that the hot flue gas in line 26, when it first contacts the bags, will have some Nahcolite Ore with which the $SO_x$ will react to form $Na_wH_yS_zO_x$, typically $Na_2SO_3/SO_4$. The precoating is done with fresh air drawn in through forced draft fan 12.

After the bags have been precoated, the remaining 80 percent of the Nahcolite Ore is slug fed or continuously fed into the flue gas stream by means of fan 14. The flue gas stream carries the powdered Nahcolite Ore onto the bags where it reacts with the $SO_2$ contained in the flue gas stream. By "slug fed" we mean feeding the powdered ore into the flue gas as fast as the flue gas can carry it without substantial drop-out of the ore prior to reaching the bags. Typical grain loadings in either feeding mode would be below about 20 grains/SCF (dry basis).

The Nahcolite Ore cake on the bags also acts as a filtering aid for trapping the particulate material which has been blown through the glass furnace 15 by the high pressure developed by the gas burner ports 16, 17 and 18. Normally, the heat source in a glass furnace is gas, so that the flue gas in duct 26 contains only sulfur dioxide and glass batching fines as the particulate material. This is in contrast to a coal fired boiler wherein the particulates are predominately ash from the coal. In the case of oil firing, the content of particulates other than from glass batching fines, may be sufficiently low to be acceptable for some green or amber glasses.

Thus, the baghouse 13 with the Nahcolite Ore layer on the bags serves the dual function of collecting the glass batch particulates and also removing the $SO_2$. The cleaned flue gas, from which up to about 99.5 percent or greater particulates have been removed, is withdrawn by I.D. fan 20 and passed to the stack 21 by duct 22. The baghouse filter cake is periodically removed from the baghouse by mechanical shaking, reverse air, pulse jet, or combination of those procedures (not shown here in detail since it is conventional). The baghouse filter cake falls down into the hopper area 23 of the baghouse 13 and may then be removed by appropriate conveying means 24 to a storage hopper 25 (optional).

A top or bottom entry baghouse may be employed, but we prefer bottom entry with a combination pulse jet and mechanical cleaning procedure. Bags are typically 11–11½ inch in diameter and 30–40 feet long. The superficial velocity, expressed as an air to cloth ratio, may be in the range of 0.1–20 feet/sec, with the preferred range being 0.5–5.0, it being understood that the lower the A/C ratio, the more efficient the particulates removal. We prefer to keep the flue gas temperature in the baghouse, and at the point of injection of the dry powdered Nahcolite into flue gas duct 26, below about 500°F when using treated glass bag fabric. The flue gas duct may employ dilution air dampers or fresh water sprays (not shown) to reduce or control flue gas temperatures above that level. The baghouse may be insulated or uninsulated, but insulation is preferred for more consistent operation, particularly through seasonal weather variations. The bags may be treated with one or more layers of silicone, graphite, Teflon, Kel-F or other conventional coatings. Other fabrics such as polyester, Nomex, Nylon, treated cotton, metal mesh and the like, may be used, depending on the temperature range of operation. Cycle times may range from 20 minutes to about 2½ hours between cleanings, with 30–60 minutes being preferred. When precoating is used, the precoating portion of the cycle takes from 1–30 minutes, with 5–20 minutes being typical. It is preferred to adjust the water vapor content of the flue gas in the range of 5–15 percent with greater than 2 percent being a critical threshold at lower temperatures (200°–300°F), and the preferred range being 5–10 percent. Higher moisture content does not adversely affect the reactivity, but bag weeping should be avoided. Very high particulate grain loadings, on the order of 16 grains/SCF (dry), have not proven to interfere with the $SO_x$ - Nahcolite Ore reaction.

The baghouse filter cake (BFC) contains the $Na_wH_yS_zO_x$, typically sodium sulfite or sulfate, produced by the reaction of sodium bicarbonate with the $SO_2$ in the flue gas coming into the baghouse in duct 26. In addition, some of the unreacted sodium bicarbonate will be roasted to produce sodium carbonate. The remaining material in the baghouse filter cake will include glass batch fines and Nahcolite Ore insoluble materials which include dolomites, silica, potassium feldspar, calcite and dawsonite.

The flue gas in duct 26 is adjusted to be in the area of about 500°F, which is the optimum operating temperature for the baghouse in terms of efficiency of removal of $SO_2$. If the incoming flue gas is of higher temperature than that, a water spray can be used to cool the flue gas down to the bag operating temperature. The efficiency of the Nahcolite reaction in the dry state drops off with temperature and is not recommended below about 200°F. However, this should be well below the operating flue gas temperature of most glass plants. Even where operating glass plant flue gas temperature is in the 200°–300°F range, loss of efficiency can be tolerated since the by-product sodium carbonate produced by roasting of the Nahcolite Ore can be used directly as a feed in the glass manufacturing process. The flue gas heat will evolve both water and $CO_2$ from the sodium bicarbonate content of the Nahcolite Ore converting it to sodium carbonate.

As can be seen from the typical assay above, the Nahcolite Ore contains about 0.8–2 percent carbon as organic material. The organics need not be removed, and can be passed into the glass melt wherein they will provide a percentage of the carbon normally used as a fining agent or colorant for the glass manufacture. The $FeS_2$ in the Nahcolite Ore can also act as a colorant.

Since the baghouse filter cake collected in surge bin 25 will generally have component particles in a size range normally too small for glass batching operations, it should be sent through a sizing operation 27, which typically may be a rotary pan agglomerator or a pelletizer. Thereafter, the appropriately sized baghouse filter cake composite material, in the range of $-20 + 150$ mesh would be retained in $SO_x$ control by-product surge bin 28. If desired, the intermediate surge bin 25 may be omitted. The pelletized baghouse filter cake material is then conveyed in materials handling means 29 to be blended with other glass batching materials in 30, and eventually passed through weighing means 31, mixing means 32, surge bin 33, glass furnace feeding means 34, and finally fed into the glass furnace 15.

At this juncture, it will be appreciated that all of the by-product material from the pollution control operations, in this example the baghouse 13, will be recycled to the glass melt. This is made possible by the unique nature of Nahcolite Ore, and the fact that the baghouse permits dry collection of fine particulate glass batching materials that are blown through the furnace. $SO_2$ evolved from sodium sulfate, a normal component in glass operations, currently represents the main, if not the only, source of $SO_2$ in glass manufacturing stack flue gases. This $SO_2$ is reconverted to sodium sulfate or sulfite in the baghouse filter cake, which is recycled to the glass furnace; thus the loop has been closed. Perhaps more severe is the particulates emissions problem, but the baghouse permits collection of both particulates and removal of $SO_2$, while at the same time converting unreacted sodium bicarbonate in the Nahcolite to sodium carbonate, known to be useful as glass batch component. There is thus no inefficiency in the use of Nahcolite Ore material.

If Nahcolite Ore is desired to be delivered to the glass plant already ground, as a 200 or less mesh sized material, it would then pass by conveying means 35 from surge bin 3 directly to the precoating duct 36 via duct 37, and to the slug or continuous feed duct 9 via duct 38. The same 80/20 proportioning, or other desired proportioning, may be obtained by adjustment proportioning feed valve 39.

The Nahcolite also offers the potential of being a substitute, as such, for soda ash as a glass batching material, and thus may be passed directly to the glass batching operations after passing through the grinder 7 via line 40. The oversize from the pollution control grinding operation may be passed as a −40 + 150 mesh, or −20 + 150 mesh material to the feed line 41 via the oversize overflow from grinder 7 in line 40.

Alternately, Nahcolite Ore can be delivered to bin 3 in the size range −20 + 150 mesh and a portion of this to be used in the baghouse further ground at the plant to −200 or smaller mesh for $SO_x$ emissions control usage.

Since the Nahcolite Ore gangue material, dolomite, silica, potassium feldspar, calcite and dawsonite, are acceptable in many glasses, e.g., green and amber glass, the oversize gangue material from the crushing operation 5 and the grinding operation 7 may be passed via lines 42 and 43, respectively, to a surge bin 44 and then metered via line 45 into the glass batching operation feed conveyor 41. Where the Fe and S content of the ore or gangue is low, they may be used in flint and plate glass.

Normally, in glass operations, silica, lime, cullet, and soda ash are brought in by rail or truck and stored in surge bins 46, 47, 48 and 49, respectively. Part or all of the soda ash 49 may be omitted, when Nahcolite Ore is passed to the conveyor feed 41 via line 50 from surge bin 3, or when the grinder oversize 40, or when crusher and grinder gangue 45 is used. In addition, it will be recognized that use of the oversize 40 and/or gangue 45 permits omitting some of the silica, lime and cullet called for in bins 46–48.

The amount of dry powdered Nahcolite Ore fed into the baghouse, by both precoat line 53 and feed line 52, depends principally on the flue gas temperature, the amount of $SO_x$ removal desired, and the A/C ratio. For example, where the A/C ratio is around 2.0 and the flue gas temperature is in the 450°–550°F range, an amount of Nahcolite Ore to provide 1.0 times stoichiometric amount of sodium bicarbonate according to the equation:

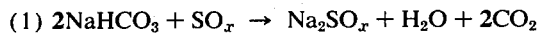

(1) $2NaHCO_3 + SO_x \rightarrow Na_2SO_x + H_2O + 2CO_2$ is used, where $SO_x$ is $SO_2$ and/or $SO_3$ forming $Na_2SO_3$ and/or $Na_2SO_4$ as the case may be, and removes 90 percent or more of the $SO_x$ at an efficiency of 80–95 percent in the dry state. At a lower temperature, in the range of 350°–450°F, the same $SO_x$ removal may be obtained by using 1.5–2.0 times the stoichiometric amount of Nahcolite Ore. Alternatively, the same 1.0 S.R. (stoichiometric ratio) at lower temperature will result in 70–80 percent removal of the $SO_x$ emissions.

An important option is use of calcined Nahcolite Ore, shipped either finely ground or in larger size on the order of −one-half inch to surge bin 3. This calcined Nahcolite Ore is then fed via lines 50 and 40 to the glass batching operation feed line 41. The calcined Nahcolite would consist primarily of a sodium carbonate material including the Nahcolite insolubles, dolomite, silica, potassium feldspar, calcite and dawsonite, as well as the organic carbon.

It is not preferred to use the calcined Nahcolite Ore in the baghouse, since tests show that sodium carbonate is less reactive with $SO_2$ than the sodium bicarbonate values of raw Nahcolite Ore. However, the calcined Nahcolite Ore may be used since no penalty will be paid for inefficiency in the baghouse reaction; the unreacted sodium carbonate in the baghouse cake can be used in the glass via lines 24, 29, 30, etc.

Glass produced in accord with this example will show useful properties, among others, for glass container manufacture.

EXAMPLE 2

Figure 2:
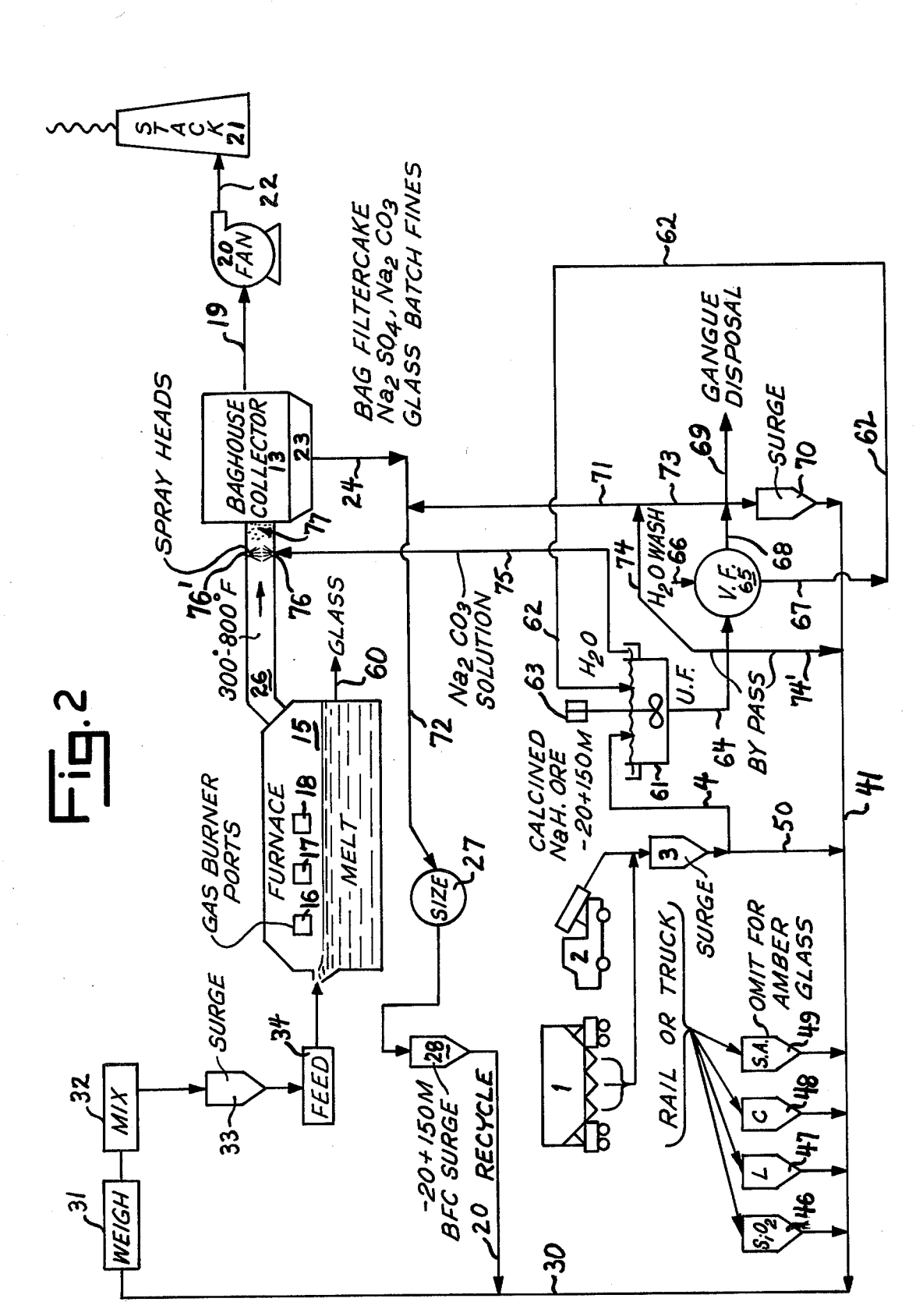

As illustrated in FIG. 2, the embodiment of this example relates to the process of this invention where the $SO_x$ reaction with the sodium alkali takes place in a wet mode, but unlike conventional wet scrubbers, the waste is not present or collected in a solution form. The liquid alkali solution is sprayed into the flue gas in a manner so that the heat dries the product $Na_wH_yS_zO_x$ (e.g., $Na_2SO_3$ and/or $Na_2SO_4$) which is collected along with the glass batch fines in the baghouse. In this embodiment the baghouse acts as a collector rather than as a reactor for $SO_x$ emissions control.

Referring now to FIG. 2, calcined Nahcolite Ore is delivered by rail 1 or truck 2 to surge bin 3 at the glass plant. The calcined Nahcolite Ore may be delivered pre-sized for glass manufacture, e.g., −20 + 150 mesh, or may be delivered as a larger size and crushed to that size (not shown) before being passed via line 50 to the glass batch components feed line 41. In the case of amber glass production, e.g., for beer bottles, the usual soda ash in hopper 49 may be in part or entirely omitted. Other components include silica 46, lime 47, cullet 48, and other standard ingredients (not shown). The kerogen content of the Nahcolite Ore may supply some or all of the carbon required in the glass making.

The glass components are conveyed via line 30 to weighing means 31, then mixed in mixer or blender 32 and held in surge tank 33 for metered feeding 34 into the mouth of furnace 15. Burners 16, 17, and 18 melt the batch and glass is withdrawn at the furnace head 60 and formed by conventional techniques. During melt formation $Na_2SO_4$ in the batch combines with carbon to form $Na_2S$ which in turn oxidizes to $SO_2$ which passes out duct 26 in the hot flue gas, typically 200°–1500°F and preferably 300°–800°F. Glass batch fines, as particulates, are physically blown out the furnace 15 into duct 26.

With respect to the $SO_x$ and particulates control, a portion of the calcined Nahcolite Ore from surge bin 3 is passed by line 4 into mixing tank 61, where it is dissolved in water from line 62 with the aid of agitator 63. The ore need not be in the range of −20 + 150 mesh for dissolution, and could be oversize from crushing or grinding operations, or large particles on the order of −one-fourth inch. The insolubles (gangue) settle in the bottom of tank 61 and are withdrawn as a slurry or sludge-like underflow, U.F., in line 64 and sent to a filtering means, such as vacuum filter 65, leaf press, or the like. The gangue is rinsed in the filter by fresh water wash 66, and the wash water plus excess liquor incoming with gangue in line 64 is recycled via line 67 to dissolution tank water supply line 62. This recycle is an important feature since it means that the process is closed loop as to water supply with makeup water being introduced via rinse water 66. The $Na_2CO_3$ content of the liquor-rinse water in line 67 does not pose a water pollution disposal problem since it is returned to the dissolution tank 61.

The filtered gangue is withdrawn from the filter means 65 via line 68 from which it may take several alternative routes. In one alternative, the gangue may be disposed of as a granular insoluble waste material, e.g., as land fill as shown by line 69. In a second embodiment, the gangue, having glass ingredient values as shown above, may be stored in surge bin 70 for feeding to glass batch components feed line 41 as required. In a third embodiment, the gangue may be conveyed via line 71 to line 72 where it is combined with bag filter cake and sized in pelletizer 27 before being recycled to the melt via line 29. The gangue in this embodiment may be provided relatively dry via line 73 after passing through the vacuum filter, and optionally a drying step, or may be supplied to the sizing step relatively moist to provide moisture for pelletizing, as by a rotary pan pelletizer 27. Where moisture is desired, a part or all of the gangue may bypass via line 74 the filtering step 65. The filtration step may be replaced by a more simple settling step with supernatant returned via line 62 to the dissolution tank 61, and the settled gangue passed moist to sizer 27, or dried, as by air drying or drying with excess heat from the glass furnace 15. In another alternative, the gangue may be dried and conveyed via line 74 to feed line 41, bypassing the vacuum filter 65.

The sodium carbonate or bicarbonate solution in tank 61 is pumped through line 75 to a plurality of spray heads 76, 76' disposed in the flue gas duct 26 upstream of the baghouse 13. The pumping rate is adjusted so that the liquid, in gallons/minute, is delivered at the spray head manifold in proportion to the flow rate of flue gas in the duct 26, in cubic feet/minute, standard or actual, to provide a liquid/gas ratio of below about 20, preferably 0.01–15, and typically 0.1–5.0. The spray heads break up the aqueous sodium alkali solution into fine droplets which present a high surface area/volume ratio to the hot gas, and excellent contact therewith is obtained. The $SO_x$ in the flue gas reacts with the sodium alkali (hydroxide, carbonate or bicarbonate) to form $Na_wH_yS_zO_x$, typically $Na_2SO_4$, $Na_2SO_3$, $NaHSO_3$ or $NaHSO_4$ depending on the oxygen content in the flue gas. The resultant sodium sulfur oxide salt, and residual sodium alkali is dried by the action of the flue gas heat, and the flue gas is cooled to baghouse operating temperature below about 550°F. Where the flue gas is very hot, 800°–2000°F, the l/g ratio may be raised to provide additional cooling of the gases. The cooling also provides the additional benefit of reducing the A.C.F.M. of the flue gases, thereby permitting a reduction in cloth area (number of bags) of the baghouse. Where a variable speed pump is used in line 75, it may be coupled with a temperature monitor in duct 26 to control the temperature of the flue gas entering baghouse 13 by varying liquid delivery rate, and therefore l/g ratio and cooling.

However, the l/g ratio should not be so high that the liquid introduced in duct 26 is not spray-dried. The spray-dried sodium sulfur oxide reaction product (e.g., $Na_2SO_4$, $Na_2SO_3$, $NaHSO_3$, $NaHSO_4$ or mixtures thereof) with any excess sodium alkali is shown as particles 77 in duct 26 downstream of the spray heads 76, 76'. The spray-dried material plus the glass batch fines are then collected by baghouse 13 and periodically removed from hoppers 23 via line 24 for recycle to the glass melt via sizing operation 27, surge 28 and feed line 29. The bag filter cake contains the sodium sulfur oxide product (e.g., $Na_2SO_4$), residual (unreacted) sodium carbonate and glass batch fines, all of which are glass ingredients and may in whole or in part be recycled to the glass melt. The bags are cleaned periodically, e.g., at intervals of 0.25–2.5 hours, as above described, but no precoating is required.

The cleaned flue gas in line 19 typically will show removal of 99.5 percent of the glass batch fines, and 90–99 percent of the $SO_x$ at l/g ratios as low as 1.0 at flue gas temperatures (baghouse entry) of 500°F, A/C ratios of 2.0 or less, and cycle (cleaning to cleaning) times of around 30 minutes. The process is also closed loop with respect to the $SO_x$ and particulates emissions control since all emissions products collected in the baghouse may be recycled to the melt. The cleaned flue gas is exhausted to stack 21 via fan 20 and duct 22.

In place of crude calcined Nahcolite Ore, raw or processed Nahcolite Ore, commercial soda ash or other sodium alkali as above identified may be dissolved in tank 61 to form the sodium alkali spray solution. The raw Nahcolite Ore produces a sodium bicarbonate solution which is effective in reaction with $SO_x$ in the spray droplets.

The amount of sodium alkali dissolved in tank 61 is not critical. As noted below, more important aspects are the concentration in line 75 and the l/g ratio. Of course, the amount should be sufficient to react with $SO_x$ in the flue gas. The utilization efficiency in aqueous spray is high, usually greater than 90 percent. Emissions monitoring makes the $SO_x$ quantities of the flue gas known, as percent or parts per million, and the sodium alkali required is simply calculable by way of the reactions:

(1) $2NaHCO_3 + SO_x \rightarrow Na_2SO_x + H_2O + 2CO_2 \uparrow$, or (2) $Na_2CO_3 + SO_x \rightarrow Na_2SO_x + CO_2 \uparrow$, where $SO_x$ is $SO_2$ and/or $SO_3$ forming $Na_2SO_3$ and/or $Na_2SO_4$ as the case may be. The $SO_x$ is usually regarded as $SO_2$ since 100 percent of the $SO_3$ is normally reacted. The actual concentration of the sodium alkali in the aqueous solution in line 75 is then dependent on the desired liquid to gas ratio, and may range from about 0.1 wt percent to saturated, with a 5–30 wt percent solution being typical.

EXAMPLE 3

Referring to FIG. 2, the wet spray - dry baghouse collection method may be applied to other flue gases with the concentration of alkali and liquid/gas ratio being adjusted to match the $SO_x$ levels in the flue gases and the removal efficiency desired. The baghouse operating parameters remain substantially the same as above, with an A/C ratio and cycle time selected to obtain the required particulates ($Na_2SO_4$ and fly ash) removal efficiency. For example, the process may be applied to $SO_x$ and fly ash emissions control of flue gas from industrial and power plants burning oil and coal fuels.

By way of a working example, for a coal-fired power plant burning typical 3 percent sulfur coal, a 2.0 A/C ratio and cycle time on the order of 30 minutes for a baghouse is operated at 300° ± 30°F. This will result in about 99.5 percent fly ash removal efficiency. If the spray contact portion of the process is run at an l/g ratio of less than about 20, where the l/g is in the range of about 1.0–3.0, and the sodium alkali concentration is present in an amount adequate to remove 100 percent of the stoichiometric amount of $SO_x$, the process will result in about 95+ percent $SO_x$ removal, with the utilization efficiency ratio (ratio of percent $SO_x$ removed to percent stoichiometric used) being about 1.0 ± 0.05. The stoichiometric amount of alkali conveniently can range from 0.5 to 5.0 times the amount needed to react with the $SO_x$ present in the flue gas. The baghouse A/C ratio should be in the range of about 0.5 to 15.0 and the temperature below about 550°F. Cycle time will be under about 1 hour.

EXAMPLE 4

This working example shows the production of glass using a calcined Nahcolite Ore in place of soda ash.

A calcined Nahcolite-bearing ore, having the composition set forth in Table V, is fed to the process of examples 1 or 2 via line 50.

TABLE V

| Quartz | $SiO_2$ | 17.1 | parts |
|---|---|---|---|
| Calcite | $CaCO_3$ | 3.3 | " |
| Dolomite | $CaCO_3 \cdot MgCO_3$ | 16.9 | " |
| Sodium Carbonate | $Na_2CO_3$ | 16.1 | " |
| Sodium Aluminate | $NaAlO_2$ | 5.9 | " |
| Iron | Fe | about 0.5 | " |
| K-Feldspar | $K-AlSi_3O_8$ | 10.2 | " |
| Residual Carbon | C | 4.4 | " |
| | | 74.4 | parts |

To this ore is added silica, sodium carbonate from soda ash or calcined Nahcolite Ore, and sodium sulfate from the baghouse filter cake, in the amounts shown in Table VI below.

TABLE VI

| | Calcined Nahcolite Ore | Add | Total |
|---|---|---|---|
| Quartz $SiO_2$ | 23.7 lbs. | 76.3 lbs. | 100.0 lbs. |
| Lime | | | |
|   CaO from calcite | 1.8 lbs. | | |
|   CaMgO from dolomite | 9.9 lbs. | | 11.7 lbs. |
| Sodium oxide | | | |
|   $Na_2O$ (from sodium carbonate or bicarbonate) | 9.4 lbs. | 10.5 lbs.$^a$ | |
|   $Na_2O$ (sodium aluminate) | 2.2 lbs. | | |
| $K_2O$ (K-Feldspar) | 1.7 lbs. | | 24.0 lbs. |
| Alumina (from dawsonite) | 3.7 lbs. | | |
|   (from K-Feldspar) | 1.9 lbs. | | 5.6 lbs. |
| Sodium sulfate ($Na_2SO_4$) | | 10.0 lbs.$^b$ | 10.0 lbs. |
| | | | 151.3 lbs. |

$^a$from Nahcolite Ore or soda ash.
$^b$from baghouse filter cake.

On a parts basis the resulting mixture of Table VI under the heading "Total" is nearly identical with a conventional plate glass formulation with the exception that alumina is present whereas it is not present in the normal plate glass. The alumina lowers the melting point of the glass somewhat and retards devitrification, and may be readily removed by leaching, if desired. The Table VI resulting mixture is then fused into a medium-green glass. Glass of this type may be poured into molding or forming units to form a glass product.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. A process for control of $SO_x$ and particulates emissions from glass furnace hot flue gases containing said emissions comprising the steps of:
   a. contacting said flue gas with a sodium alkali derived from a sodium bicarbonate-containing source, for a time sufficient to react $SO_x$ in said gas with said alkali to produce a sodium sulfur oxide salt of said $SO_x$,
   b. collecting said salt and said particulates in a baghouse as baghouse filter cake material,
   c. removing baghouse filter cake material from said baghouse,
   d. sizing said baghouse filter cake material to within a range of about −20 + 150 mesh,
   e. returning said sized baghouse filter cake material to said glass furnace, thereby to provide sodium sulfur oxide values to said glass furnace without producing a water pollution disposal problem while controlling said emissions.

2. A pollution control process as in claim 1 wherein said sodium bicarbonate-containing source is selected from an ore and a solution containing $NaHCO_3$.

3. A pollution control process as in claim 2 wherein said sodium alkali is present in an aqueous solution.

4. A pollution control process as in claim 3 wherein said step of contacting includes spraying said aqueous solution into said flue gases at an l/g ratio of less than about 20 so that it is spray-dried in contact with said hot flue gases while $SO_x$ is reacting therewith, and said collecting step includes collecting spray-dried sodium sulfur oxide salt and glass batch fines as said particulates.

5. A pollution control process as in claim 4 wherein said baghouse is maintained at a temperature below about 550°F and at an air to cloth ratio of less than 20 ft/sec.

6. A pollution control process as in claim 2 wherein said ore is Nahcolite Ore selected from raw ore, calcined ore, processed ore, and mixtures thereof.

7. A pollution control process as in claim 6 which includes the steps of:
   a. dissolving said Nahcolite Ore in water to form said aqueous alkali solution and insoluble gangue material, and
   b. removing said gangue material from said solution.

8. A pollution control process as in claim 7 wherein said gangue removal step includes separating water from said gangue and recycling said water to said dissolution step to close the water loop and thereby reduce water pollution.

9. A pollution control process as in claim 7 wherein said gangue is recycled to said glass furnace.

10. A pollution control process as in claim 9 wherein said recycle step includes combining said gangue with said baghouse filter cake material.

11. A pollution control process as in claim 10 wherein said gangue contains residual water to assist in sizing baghouse filter cake material.

12. A pollution control process as in claim 1 wherein said sodium alkali is injected into said baghouse in a dry, powdered state, and said baghouse functions both as a reactor for said $SO_x$ - sodium alkali reaction and a collector of glass batch fines particulates.

13. A pollution control process as in claim 12 wherein a portion of said sodium alkali is precoated on said bags prior to being turned on stream for collection of said glass batch fines particulates and $SO_x$.

14. A pollution control process as in claim 13 wherein said sodium alkali is derived from Nahcolite Ore in a raw state, a crude calcined state, a processed state, or mixtures thereof.

15. A pollution control process as in claim 13 wherein said sodium alkali powder is in a size range of 90 percent less than 200 mesh.

16. A pollution control process as in claim 13 wherein the baghouse temperature is maintained below about 550°F during its cycle of operation.

17. A pollution control process as in claim 16 wherein the baghouse air to cloth ratio is less than about 15 ft/sec, and said sodium alkali is present in said baghouse at a time during the baghouse cycle in an amount to provide between about 0.5 and 5.0 times the stoichiometric amount of sodium alkali required to react with the $SO_x$ present in the flue gas at a time during the baghouse cycle.

18. A pollution control process as in claim 17 wherein the water vapor content in said flue gas is maintained in the range of between about 2–20 percent.

19. A pollution control process as in claim 18 wherein said sodium alkali is selected from Nahcolite Ore in a raw, crude calcined, a processed state, or mixtures thereof.

20. An integrated process for production of glass in a glass furnace wherein a single type of sodium alkali is used both for $Na_2O$ content of the glass and for furnace hot flue gas $SO_x$ emissions control comprising the steps of:
  a. providing a sodium alkali derived from a sodium bicarbonate-containing source selected from an ore and a solution containing sodium bicarbonate,
  b. separating said sodium alkali into a first and a second portion,
  c. contacting flue gas from said furnace with said first alkali portion for a time sufficient to react $SO_x$ in said flue gas with said alkali to form a sodium sulfur oxide salt,
  d. recycling a portion of said sodium sulfur oxide salt to said furnace without producing a water pollution disposal problem,
  feeding said second portion of said sodium alkali to said furnace to provide $Na_2O$ content to said glass, and
  f. evolving $SO_x$ from the glass melt in said furnace.

21. A pollution controlled glass process as in claim 20 wherein said sodium alkali is selected from raw Nahcolite Ore, crude calcined Nahcolite Ore, processed Nahcolite Ore, and mixtures thereof.

22. A pollution controlled glass process as in claim 21 wherein gangue from said Nahcolite Ore is used as a glass component in the glass furnace.

23. A pollution controlled glass process as in claim 21 wherein said first alkali portion is injected into said baghouse in a dry, powdered state, and said baghouse functions both as a reactor for said $SO_x$ - sodium alkali reaction and as a collector of glass batch fines particulates.

24. A pollution controlled glass process as in claim 23 wherein said sodium alkali is derived from Nahcolite Ore in a raw state, a crude calcined state, a processed state, or mixtures thereof.

25. A pollution controlled glass process as in claim 20 wherein said first alkali portion is present in an aqueous solution.

26. A pollution controlled glass process as in claim 25 wherein said step of contacting includes spraying said aqueous solution into said flue gases at an l/g ratio of less than about 20 so that it is spray-dried in contact with said hot flue gases while $SO_x$ is reacting therewith to produce said sodium sulfur oxide salt, and said spray-dried reacted alkali is collected in a baghouse downstream of said spraying while said baghouse collects glass batch fines particulates as a baghouse filter cake material containing said sodium sulfur oxide salt.

27. A pollution controlled glass process as in claim 26 wherein said sodium alkali solution is derived from Nahcolite Ore selected from raw ore, calcined ore, processed ore, or mixtures thereof.

28. A pollution controlled glass process as in claim 27 which includes the steps of:
  a. dissolving said first portion of said Nahcolite Ore in water to form said aqueous alkali solution and insoluble gangue material, and
  b. removing said gangue material from said solution.

29. A pollution controlled glass process as in claim 28 wherein said gangue removal step includes separating water from said gangue and recycling said water to said dissolution step to close the water loop and thereby reduce water pollution.

30. A pollution controlled glass process as in claim 28 wherein said gangue is recycled to said glass furnace.

31. A pollution controlled glass process as in claim 30 wherein said recycle step includes combining said gangue with said baghouse filter cake material.

32. A pollution controlled glass process as in claim 31 wherein said gangue contains residual water to assist in sizing baghouse filter cake material.

* * * * *